United States Patent [19]

Bennett

[11] Patent Number: 5,307,410
[45] Date of Patent: Apr. 26, 1994

[54] INTERFEROMETRIC QUANTUM CRYPTOGRAPHIC KEY DISTRIBUTION SYSTEM

[75] Inventor: Charles H. Bennett, Croton-On-Hudson, N.Y.

[73] Assignee: International Business Machines Corporation, Armonk, N.Y.

[21] Appl. No.: 66,743

[22] Filed: May 25, 1993

[51] Int. Cl.⁵ .................. H04L 9/08; H04L 9/22; H04B 10/18; H04B 10/20

[52] U.S. Cl. ........................ 380/21; 380/44; 380/59; 359/112; 359/118

[58] Field of Search .............. 380/21, 43, 44, 33, 380/54, 59; 359/112, 118

[56] References Cited

U.S. PATENT DOCUMENTS

| | | | |
|---|---|---|---|
| 4,866,699 | 9/1989 | Brackett et al. | 370/3 |
| 4,879,763 | 11/1989 | Wood | 455/607 |
| 4,903,339 | 2/1990 | Solomon | 455/612 |
| 4,965,856 | 10/1990 | Swanic | 455/617 |
| 5,140,636 | 8/1992 | Albares | 380/54 |
| 5,191,614 | 3/1993 | LeCong | 380/49 |

Primary Examiner—Gilberto Barrón, Jr.
Attorney, Agent, or Firm—Robert M. Trepp

[57] ABSTRACT

An apparatus and method for distributing cryptographic key information is described incorporating a quantum channel for conveying dim and reference light pulses, a timing channel, a source of coherent light pulses, beamsplitters, a random number generator, a phase modulator and a memory for recording the phase of transmitted dim light pulses. A cryptographic key receiver is described incorporating beam splitters, a random number generator, a phase modulator, a detector and a memory for recording the phase of received dim light pulses. The invention overcomes the problem of distributing fresh cryptographic key information between two users who share no secret information initially.

10 Claims, 3 Drawing Sheets

INTERFEROMETRIC QUANTUM CRYPTOGRAPHIC KEY DISTRIBUTION SYSTEM

BACKGROUND OF THE INVENTION

1. Field of the Invention

This invention relates to distributing cryptographic key information and, more particularly, to constructive and destructive interference of light pulses of such low intensity that they could not in principle be measured reliably by an eavesdropper.

2. Description of the Prior Art

If two users possess shared random secret information ("key"), they can achieve, with provable security, the two chief goals of cryptography: 1) making their messages unintelligible to an eavesdropper and 2) distinguishing legitimate messages from forged or altered ones. A one-time-pad encryption achieves the first goal while Wegman-Carter authentication achieves the second goal. Unfortunately, both one-time-pad encryption and Wegman-Carter authentication consume key information and render it unfit for reuse. Therefore, some means of distributing fresh key information is needed in order for two users to achieve provable security that their messages are unintelligible to an eavesdropper. One way of distributing fresh key information is by carrying a material storage medium such as magnetic tape, containing a copy of the fresh key, from one user to the other. Such a key is good only between the two users who have copies of it, and its security depends on its having been continually protected from inspection not only during its transport from one user to the other, but during the entire time from its generation until its destruction after the users have used to encrypt or authenticate a particular message and no longer need it. The logistic problems of key distribution and storage are so great that many applications, such as secure telephones, instead use purely mathematical techniques by which two users, who may not have anticipated their need to communicate secretly, can nevertheless agree over an insecure telephone line on a "session key" which they use to encrypt the ensuing conversation and then destroy. Unfortunately, all such mathematical techniques for key agreement over an unprotected channel rest on unproven assumptions such as the difficulty of factoring large numbers.

In a publication by C. H. Bennet and G. Brassard entitled "Quantum Public Key Distribution System", *IBM Technical Disclosure Bulletin*, 28, 3153 (1985), faint pulses of polarized light are used to distribute key information via a low-attenuating (10-20 dB), non-depolarizing optical channel, called the "quantum channel". By utilizing the "quantum channel", two users can agree on a secret key in an impromptu manner, just before it is needed, but with provable security based on the uncertainty principle of quantum physics. To do so, the users may not exchange any material medium, but they do require a communication channel of a particular physical form, whose transmissions, owing to the uncertainty principle, cannot be eavesdropped on without disturbance.

In a publication by A. K., Ekert et al., entitled "Practical Quantum Cryptography Based on Two-Photon Interferometry", Phys. Rev. Lett., 69, 1293 (1992), a short-wavelength laser illuminates a suitably cut non-linear crystal. Apertures $A_S$ and $A_I$ select photon pair beams which are launched into single-mode fibers by lenses L. Identical Mach-Zehnder interferometers are placed in the signal and idler arms of the apparatus. The interferometer outputs are viewed by signals So, Sl and idler Io, Il single-photon counting detectors.

In quantum cryptography, after the quantum transmission has been sent and received, the sender and receiver exchange further messages through a second channel, called the "public channel", which may be of any physical form such as an optical, microwave, or radio channel. These messages, which need not be kept secret from the eavesdropper, allow the legitimate sender and receiver to assess the extent of the disturbance of the quantum transmission by eavesdropping by another and noise sources such as photomultiplier dark current, and, if the disturbance of the quantum transmission has not been too great, to distill from the sent and received versions of the quantum transmission a smaller body of random key information which with high probability is known to the sender and receiver but to no one else.

To prevent an impersonation attack, the public channel messages must be authenticated or otherwise protected against alternation or substitution, but they need not be kept secret. It should be emphasized that in quantum cryptography, no effort need be made to guard the quantum channel against passive or active wiretapping, because even if an eavesdropper did tap into it, the eavesdropper could not gain significant information about the key without introducing so much disturbance of the quantum transmission as to be detected. In the embodiment described in the publication by Bennett et al. above, each key bit is encoded in the polarization state of a single dim light pulse. When an optical fiber is used as the quantum channel, the polarization state of a single dim light pulse is affected by the mechanical and thermal fluctuations in the fiber environment which causes the output polarization of a long fiber to wander unpredictably.

SUMMARY OF THE INVENTION

In accordance with the present invention, an apparatus and method is described for sending messages unintelligible to an eavesdropper comprising a plurality of n communication nodes, each having a first, second and third port, a first quantum channel for conveying dim and reference light pulses connected to the first port of the plurality of communication nodes, a second timing channel for conveying timing signals connected to the second port of the plurality of communication nodes, a third message channel for conveying information selected from the group consisting of plain text and encrypted text connected to the third port of the plurality of communication nodes, at least one of the communication nodes including a first source of coherent light pulses and one or more beamsplitters for sending a plurality of dim light pulses of coherent light of an intensity less than one expected photon per dim pulse spaced apart in time over the first quantum channel, a second source of coherent light pulses for sending a plurality of reference light pulses of coherent light positioned in time with respect to the plurality of dim light pulses over the first quantum channel, a random number generator for generating random numbers, a phase modulation coupled to the first source of coherent light pulses and one or more beamsplitter and to the random number generator for setting the phase of the plurality of dim light pulses, the phase of each dim light pulse chosen randomly from a plurality of predetermined values in response to the random numbers, a first memory for recording the phases of the plurality of dim light pulses sent over the first quantum channel as a function of time, a first circuit for sending timing signals over the second timing channel, and a second circuit for sending and receiving information over the third message channel, at least another one of the communication nodes including one or more beamsplitters and a photodetector connected to the first quantum channel for receiving and detecting at least some of the dim light pulses and their respective phase relative to the phase of respective ones of the plurality of reference pulses as a function of time, a second memory for recording the phases of the plurality of dim light pulses received as a function of time, and a third circuit for sending and receiving information over the third message channel.

The invention further provides an apparatus and method for distributing cryptographic key information from a first communication node to a second communication node comprising a first quantum channel for conveying dim and reference light pulses connected the first and second communication nodes, a second timing channel for conveying timing signals connected to the first and second communication nodes, the first communication node including a first source of coherent light pulses and one or more beamsplitters for sending a plurality of dim light pulses of coherent light of an intensity less than one expected photon per dim light pulse spaced apart in time over the first quantum channel, a second source of coherent light pulses for sending a plurality of reference light pulses positioned in time with respect to the plurality of dim light pulses over the first quantum channel, a random number generator for generating random numbers, a phase modulator coupled to the first source of light pulses and one or more beamsplitters and to the random number generator for setting the phase of the plurality of dim light pulses, the phase of each dim light pulse chosen randomly from a plurality of predetermined values in response to the random numbers, a first memory for recording the phase of the dim light pulses as a function of time, and a first circuit for generating and sending a plurality of timing signals over the second timing channel, the second communication node including one or more beamsplitters and a photodetector connected to the first quantum channel for detecting at least some of the dim light pulses and their respective phase relative to respective one of the plurality of reference pulses as a function of time, and a second memory of recording the phases of the plurality of dim light pulses as a function of time.

BRIEF DESCRIPTION OF THE DRAWINGS

These and other features, objects, and advantages of the present invention will become apparent upon a consideration of the following detailed description of the invention when read in conjunction with the drawing, in which.

DESCRIPTION OF THE PREFERRED EMBODIMENT

Figure 1:
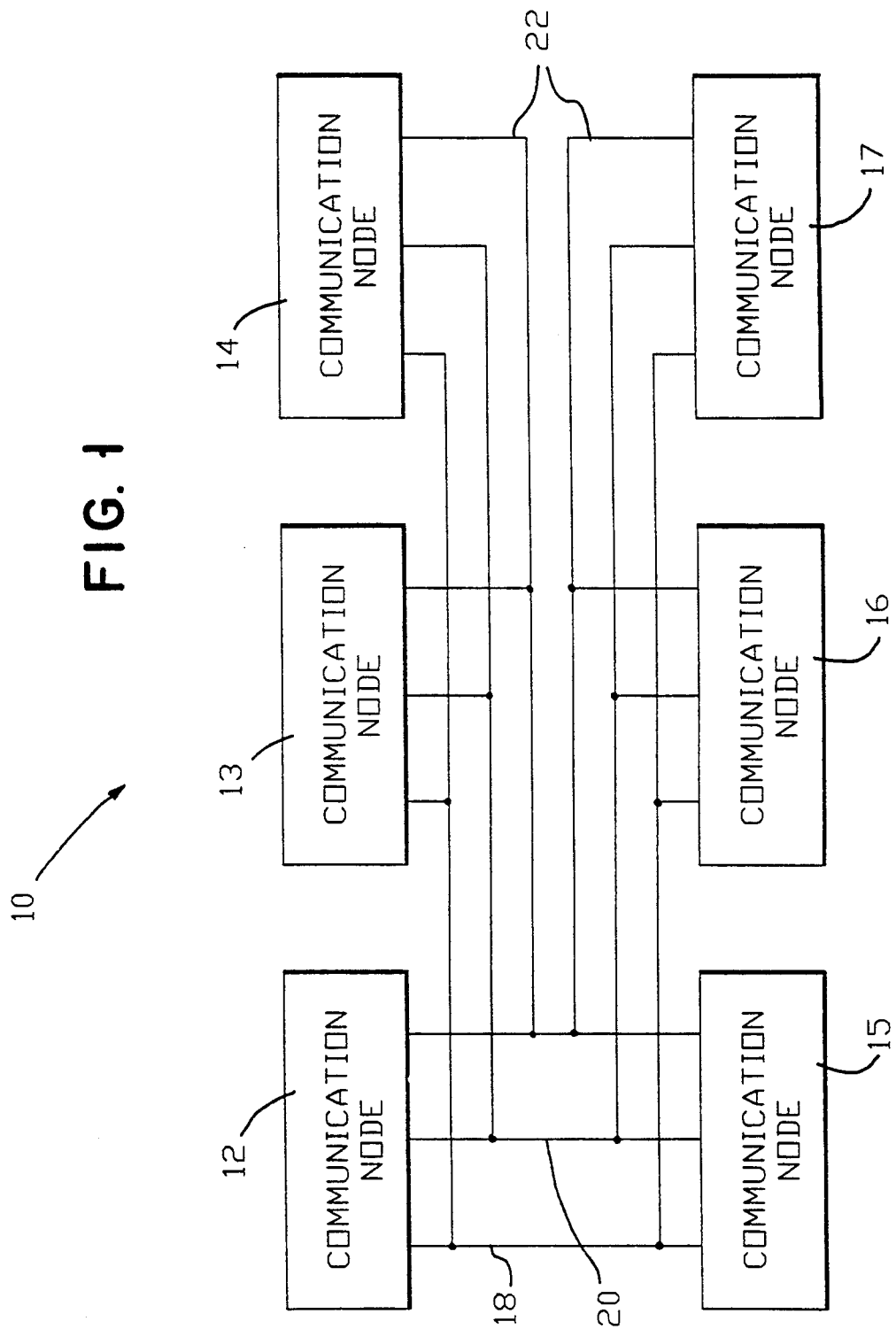
FIG. 1 is one embodiment of the invention.

Referring now to the drawing, FIG. 1 shows a block diagram of a secure communication network 10 for sending messages unintelligible to an eavesdropper. Secure communication network 10 includes communication nodes 12-17, each having a first, second and third port. The first port of communication nodes 12-17 are coupled to quantum channel 18. Quantum channel 18 functions to convey dim and reference light pulses from one communication node to all the other communication nodes. Quantum channel 18 may be, for example, an optical channel comprising a single mode fiber. By conveying dim and reference light pulses down an optical fiber, mechanical and thermal fluctuations in the fiber environment on each dim light pulse is largely cancelled by a compensating effect on the accompanying reference light pulse. Because of the dim light pulse tolerance for attenuating and environmental fluctuations, the quantum channel is suitable for use in a passive tree-connected multi-user fiber optic network involving several splitters and outdoor links between a typical pair of users. It is merely necessary that total losses between sender and receiver be small enough that the signal pulses, having approximately $\frac{1}{4}$ expected photon intensity at the sending end, still yielding a counting rate well above the photodetector dark count rate at the receiving end. It is not necessary for security purposes to isolate the sender and the receiver from the rest of the communication nodes in secure communication network 10. As will be explained subsequently, if other communication nodes than the sender and the receiver attempt to listen in on a key-distributing communication, the other communication nodes will be in no better position than outside eavesdropper, and will not be able to gain significant information about the key agreed on between a sender and a receiver, for example, where the sender is communication node 12 and the receiver is communication node 17.

A second port of communication nodes 12-17 is coupled to timing channel 20. Timing channel 20 functions to convey timing signals from a sender which may be, for example, communication node 12 to the other communication nodes, for example, 13-17. Timing channel 20 may be, for example, an optical fiber, and more particularly, a single mode fiber.

A third port of communication nodes 12-17 is coupled to a message channel 22. Message channel 22 functions to convey information from the sender to an intended receiver and from the receiver to the intended sender in plain text as well as encrypted text after a key has been agreed upon or distributed between the two.

Figure 2:
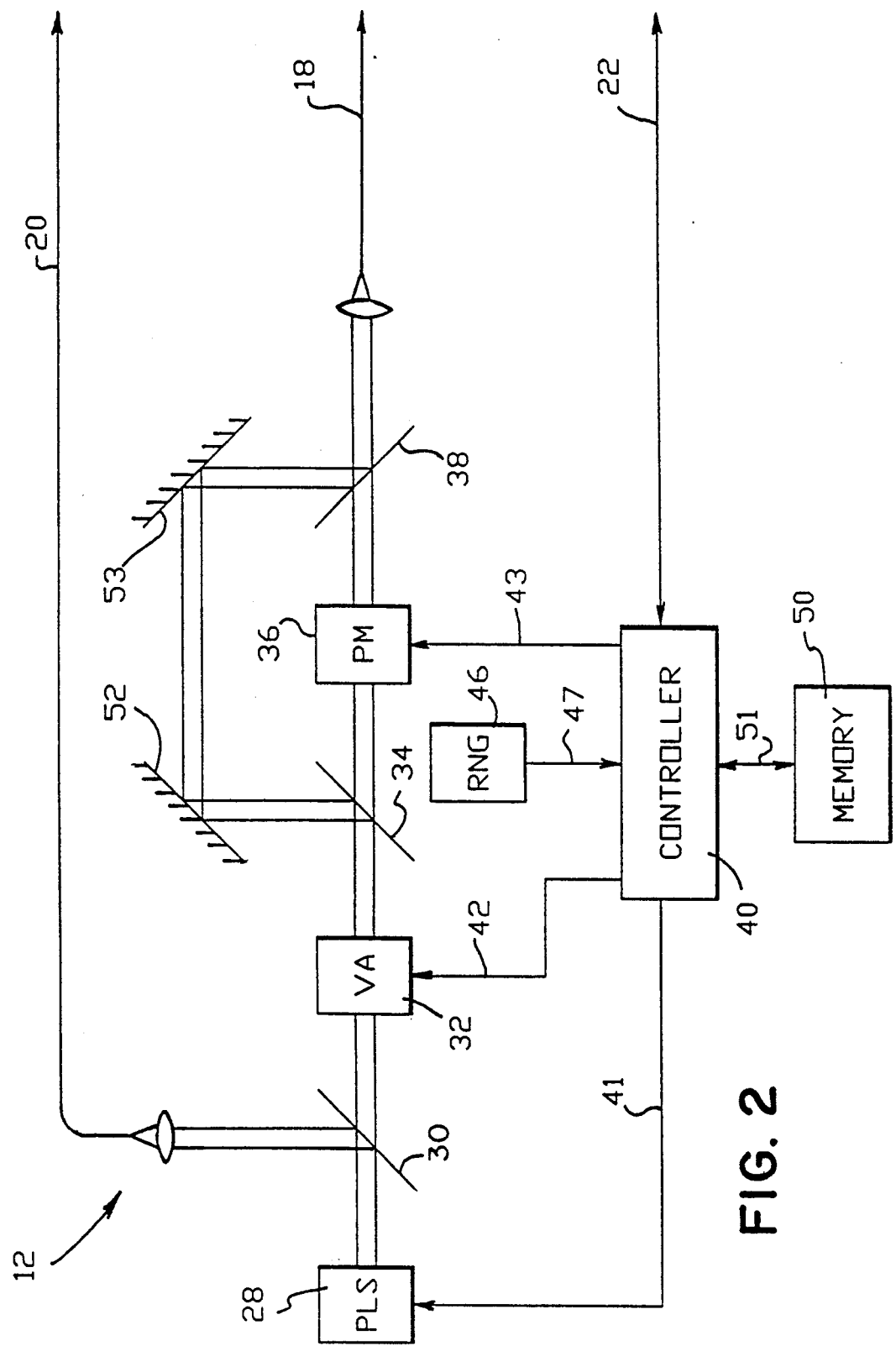
FIG. 2 is one embodiment of a communication node shown in FIG. 1 containing a key generator.

FIG. 2 is one embodiment of communication node 12 shown in FIG. 1. In FIG. 2, like references are used for functions corresponding to the apparatus of FIG. 1. Pulsed light source 28 functions to provide a coherent light pulse at a selected frequency through beamsplitter 30, variable attenuator 32, beamsplitter 34, phase modulator 36, beamsplitter 38 into quantum channel 18. Controller 40 provides a control signal over lead 41 to pulsed light source 28 to generate a respective pulse. Controller 40 provides a control signal over lead 42 to a control input of variable attenuator 32. Variable attenuator 32 is generally set to one value during the distribution of cryptographic key information. Variable attenuator 32 is set to a second value which is normally for less attenuation during calibration of a key receiver. During calibration, the intensity of the dim light pulse must be increased so that it may be reliably received at the key receiver. Beamsplitter 30 functions to divert or reflect a part of the light pulse generated by pulse light source 28 into timing channel 20 which may be, for example, a single mode fiber similar to that used for the quantum channel 18. Beamsplitters 34 and 38 have a reflection/transmission ratio R which is greater than 1 causing the reflected light pulse to be greater in intensity than the light pulse passing forward into phase modulator 36. Phase modulator 36 functions to introduce or set the phase of a coherent light pulse from pulsed light source 38. The phase shift is chosen randomly from a fixed set of possible values, for example, two values 0° or 180°, or the four values 0°, 90°, 180° and 260°. Controller 40 provides a control signal over lead 43 to phase modulator 36 to set the phase of the coherent light pulse passing through phase modulator 36.

Random number generator 46 is coupled over lead 47 to an input of controller 40. Random number generator 46 functions to create true random number which may be used by controller 40 to set the phase of the plurality of light pulses passing through phase modulator 36 wherein the phase of each of the light pulses is chosen randomly from a plurality of predetermined values in response to the random numbers from random number generator 46.

Controller 40 is connected to memory 50 by way of lead 51. Memory 50 functions to record the phase set in the light pulses passing through phase modulator 36 as a function of time. Controller 40 also functions to send and receive information or messages over message channel 22.

Beamsplitter 34 reflects a portion of the incident light pulse. The reflected light pulse off beamsplitter 34 is delayed by a fixed amount by mirrors 52 and 53 and recombined with the signal beam (dim light pulse) by beamsplitter 38. Together, beamsplitter 34, phase modulator 36, mirror 52, mirror 53, and beamsplitter 38 constitute the "senders half-interferometer" and operates to create pulsed pairs, a single pulse followed by a reference pulse, with a fixed time delay and relative phase chosen by the sender. As each pulsed pair is sent, its phase shift is recorded by memory 50 for use in subsequent steps of the key-distribution protocol. The pulsed duration should be comparable to the resolving time of the detector shown in FIG. 3 of the key receiver and the time delay should be enough larger to allow the signal (dim light pulse) and reference light pulses to be cleanly separated after passage through quantum channel 18. If quantum channel 18 is a single mode fiber of several kn length, a few nanoseconds should be sufficient. Variable attenuator 32 is set, and the splitting ratio R of beamsplitters 34 and 38 are chosen so that the dim light pulse has an intensity m of less than 1 expected photons per pulse and the reference pulses have an intensity M equal to $mR^2$ photons. The reference pulse intensity M is made sufficiently large that the reference-like pulses after passage through quantum channel 18 are still bright enough to be reliably detected at the key receiver shown in FIG. 3. The dim light pulses, of course, are so dim that most of the time they could not be detected even by a perfectly efficient detector located at the sending end of quantum channel 18.

Quantum channel 18 should have low dispersion and low attenuation, for example in the range from 0 to 20 dB, since the effective range of the system is the distance beyond which the dim light pulse are so attenuated and/or time-broadened that their intensity approaches the dark current equivalent noise input of the detector used at the receiving end of quantum channel 18.

In FIG. 2, random number generator 46, controller 40 and phase modulator 36 function as a key generator with respect to light pulses emitted by pulsed light source 28 which is attenuated as it passes through beamsplitters 30, 34 and 38.

Figure 3:
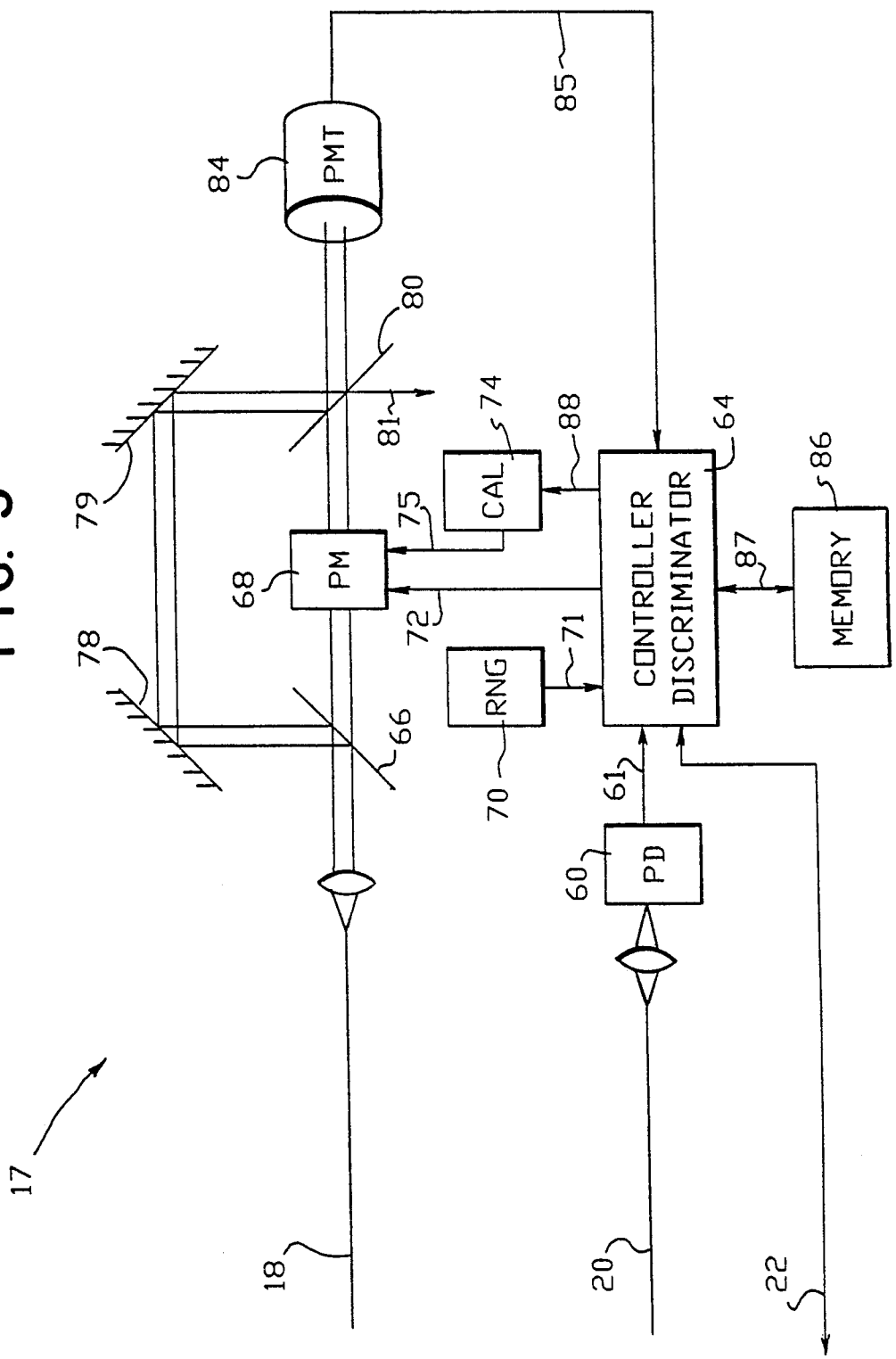
FIG. 3 is a second embodiment of a communication node shown in FIG. 1 containing a key receiver.

Referring to FIG. 3, a block diagram is shown of communication node 17 which functions as a key receiver to receive cryptographic key information from communication node 12. In FIG. 3, like references are used for functions corresponding to the apparatus of FIGS. 1 and 2. Nodes 13-16 may incorporate the embodiment of node 12 if communications nodes 13-16 are to be able to communicate with communication node 17. Alternately, communication nodes 13-16 may have an embodiment similar to communication node 17 as shown in FIG. 3 if communication nodes 13-16 are to be able to communicate with communication node 12. The apparatus of communication nodes 12 and 17 may be combined to form a universal node having the capability to distribute key information with any other communication nodes and to receive key information distributed from any other communication node.

Referring to FIG. 3, light pulses on timing channel 20 are detected by photodiode 60 which functions to convert the optical timing signal into electronic form which is coupled over lead 61 to an input of controller-discriminator 64. The corresponding dim light pulse from quantum channel 18 passes into beamsplitter 66 with a splitting ratio R equal to that of beamsplitters 34 and 38 shown in FIG. 2. Beamsplitter 66 functions to split the incoming dim light pulse into a delayed reflected part and an undelayed transmitted part. The transmitted part passes through phase modulator 68 which applied a random phase shift $\theta$ and a fixed phase shift $\phi$. Random phase shift $\theta$ is chosen from a fixed set of possible values which may be the same as the set of possible values used by the sender, communication node 12. Random number generator 70 functions to generate random numbers which are coupled over lead 71 to an input of controller-discriminator 64. A phase value is chosen randomly from a plurality of predetermined values in response to the random numbers on lead 71 is coupled over lead 72 to a control input of phase modulator 68. Calibration circuit 74 provides a constant phase shift $\phi$ signal over lead 75 which may be, for example, an adjustable DC offset.

The reflected beam from beamsplitter 66 is delayed by mirrors 78 and 79 and recombine with the transmitted beam by beamsplitter 80 of the same splitting ratio R as beamsplitter 66. Beamsplitter 66, phase modulator 68, mirror 78, mirror 79 and beamsplitter 80 comprise the "receiver's half-interferometer," which is identical to the sender's half-interferometer except for the adjustable constant phase offset $\phi$. One of the two beams leaving beamsplitter 80 is discarded shown by arrow 81. The other beam consisting of the superposition of the reflected part of the previously reflected beam from beamsplitter 66 and the transmitted part of the previously transmitted beam through beamsplitter 66 passes into a fast but sensitive photodetector 84, capable of detecting single photons with a time resolution smaller than the delay between signal (dim light pulses and reference pulses). Photodetector 84 may be, for example, an avalanche photodiode cooled to $-20°$ C. Photodetector 84 may be, for example, a photomultiplier tube such as a microchannel plate photomultiplier tube. Suitable photodetectors 84 are available from suppliers such as EG & G.

The signal received by photodetector 84 consists of three parts separated in time: an undelayed pulse (denoted SS) which has taken the short path through both the senders and the receivers half interferometers; a once-delayed pulse (SL+LS) which is the superposition of the beam phase-modulated by the sender and delayed by the receiver with that delayed by the sender and phase-modulated by the receiver; and finally a twice-delayed pulse (LL), which has taken the long path through both the senders and the receivers half-interferometers. It is understood that the senders half-interferometer is shown in FIG. 2 while the receivers half-interferometer is shown in FIG. 3.

Any counts in photodetector 84 produced by the undelayed SS pulse are discarded by the controller-discriminator 64. The once-delayed SL+LS pulse contains the important data, i.e. the phase shifts set by the sender and receiver. If these differ by 0°, constructive interference occurs and a count may be registered by the detector. If the phase shift set by the sender and receiver differ by 180°, the interference will be destructive, and no count will be registered by photodetector 84 except perhaps a count due to dark current or to imperfect cancellation of the interfering light beams. Other phase differences such as 90° will yield a lesser probability of detecting a count from photodetector 84. The controller-discriminator 64 appends any count resulting from the once-delayed SL+LS pulse, along with the random phase shift part $\theta$ of the receivers phase shift, to memory 86 which is coupled over lead 87 to controller-discriminator 64. The phase shift data in memory 86 will be used, along with the senders record of phase shifts in memory 50 in subsequent steps of the key-distribution protocol. Memory 86 may store or record the phase shifts set by phase modulator 68 as a function of time.

The twice-delayed LL pulse is brighter by a factor approximately $R^2$ than the SL+LS pulse. Although the LL pulse contains no phase information, it is still valuable because its arrival, at the correct time and with the correct intensity, can be monitored by the photodetector 84 to guard against a type of active eavesdropping "selective pulse suppression". The receivers controller-discriminator 64 therefore notes the arrival time and approximate intensity of each LL pulse, and stores this information in memory 86. The output of photodetector 84 is coupled over lead 85 to an input of controller-discriminator 64. Controller-discriminator 64 couples a control signal over lead 88 to calibration circuit 74. An ancillary part of communication node 17 is calibration circuit 74 which is used when necessary to null the receivers half-interferometer, by adjusting its DC offset $\phi$ so that pulsed pairs with 0° total AC phase shift from sender and receiver result in maximal, and pulsed pairs with 180° total AC phase shifts result in minimal intensity at photodetector 84. The periodic nulling by calibration circuit 74 will typically be necessary because of thermal and mechanical variations in the optical path lengths of the two half-interferometers shown in FIGS. 2 and 3 and it is best done using special nulling pulsed pairs with pre-arranged phase shifts and the same intensity ratio, but higher absolute intensity, than the pulsed pairs used for cryptographic key data transmission. The variable attenuator 32 shown in FIG. 2 gives the sender the capacity to produce these brighter pulsed pairs when needed. When these nulling pulsed pairs pass through the receivers half-interferometer, they will produce a rather bright twice-delayed pulse in addition to the once-delayed pulse used for nulling. If this twice-delayed pulse is too bright for the photodetector 84, the photodetector 84 can be protected by an external shutter or internally gated off during the time the too-bright pulse is expected.

The intensity of the SL and LS pulses is deliberately made of very low in the range from 0.05 to one expected photon such as, for example, $\frac{1}{3}$ expected photon so that even a photodetector of 100% quantum efficiency would fail to detect a significant fraction of constructively-interfering pulsed pairs. This is done to ensure that an eavesdropper even if the eavesdropper had perfectly efficient detectors, could still not gain complete information about the phase shifts set by the sender. The intended receiver, communication node 17, also cannot determine all the phase shifts set by the sender, communication node 12, but goes ahead anyway, recording those instances in which communication node 17 receives a count. Barring dark counts and other noise sources, these "successful measurements" will confirm that for that particular time slot, the two randomly chosen phase shifts were not such as to produce destructive interference. In the remaining "unsuccessful measurements," i.e. time slots where no count is registered, communication node 17 will not know whether the absence of a count is due to the destructive interference, or to constructive interference followed by failure to detect a photon. If communication node 17 and communication node 12 each use only the phase shift values 0° and 180°, then communication node 12's receipt of photon will, barring noise, reveal what communication node 12's phase shift was for that time slot. If a larger set of phase-shift values, such as 0°, 90°, 180°, and 270° is used, then a circumspect public discussion allows communication node 12 and communication node 17 to eliminate from their date cases of partially constructed interference, for example, where the total phase shift is 90° or 270°, so that, again barring noise, there remaining data will consist of instances in which receipt of a photon reveals to communication node 17 what communication node 12's phase shift was.

Controller-discriminator 64 includes circuitry for sending and receiving information over message channel 22.

An important design consideration is the choice of photodetector 84. Ideally, photodetector 84 should be able to count single photons with high quantum efficiency, low dark count, and fast time resolution. In communication node 17, it is necessary to count both the signal (SL+LS) and reference signal (LL) pulsed from each event, photodetector 84 should also have negligible dead time and moderate dynamic range, being able to monitor the intensity of the relative bright pulses while still efficiently counting single photons in the signal pulses.

Microchannel plate photomultipler tubes approximate many of these requirements, but at the infrared wavelengths most suitable for fiber optic communication, their quantum efficiency is poor compared to that of avalanche photodiodes, which in turn have poor dead-time and dynamic-range performance. This limitation can be overcome by replacing photodetector 84 by a dual detector assembly, in which an unsymmetric beam splitter would route most of the incoming light intensity into a high efficiency single-photon detector for the signal pulses, while sending the rest to a lower-efficiency proportional detector which would thus be able to monitor the reference pulses even if they arrive during the dead time following detection of a signal pulse by the more efficient detector.

Other construction options include the choice between bulk optic and fiber optic components in between polarization-insensitive and polarization-sensitive components. For quantum channel 18, optical fiber (low cost, compact size, and flexibility) will generally outweigh those of an unguided light beam (freedom from birefringence and attenuation). It should be recalled that quantum cryptographic signals cannot be amplified in transit, since a repeater would disturb a signal in the same way as an eavesdropper. Therefore, attenuation is probably the most serious limitation in an optic fiber implementation of quantum channel 18. Either polarization-maintaining or ordinarily single-mode fiber could be used in quantum channel 18. For the half-interferometers, one could use a polarization-degenerate design if sufficient polarization and sensitive components, for example, beamsplitters, phase modulators, were available. Alternatively, one could use a non-degenerate design in which the senders half-interferometer would produce output pulsed-pairs of fixed polarization, and the receivers half-interferometer would analyze only the same polarization component. If a non-polarization-maintaining fiber were used in the channel, the channel output polarization would drift randomly due to environmental fluctuations. This could be handled by using a polarization-degenerate design at the receiving end, or by measuring only one polarization component which would reduce the data rate by two.

A symmetric beamsplitter version of the present invention would have R equal to 1 for beamsplitters 34 and 38 shown in FIG. 2 and beamsplitters 66 and 80 shown in FIG. 3. In the symmetric beamsplitter version, there is an advantage of not requiring active polarization control to combat environmental laundering of the polarization in the long optic fiber. The data rate of the symmetric version could be increased two-fold by using a symmetric detector configuration, with a second detector similar to photodetector 84 to catch the beam leaving at the bottom of beamsplitter 80 shown by arrow 81. The symmetric version would need to use more than two phase shift values, for example, the four values 0°, 90°, 180° and 270° to avoid an especially fatal version of the selective pulse suppression attach that would otherwise render the scheme insecure at any pulse intensity.

A virtue of the present invention is that, since an eavesdropper can gain only partial information about the quantum transmission, the legitimate users have the ability, through public channel communications and mathematical transformations, to derive from the quantum transmission a body of certifiable shared secret information, or to conclude that the quantum transmission has been so disturbed by noise and/or eavesdropping that no secret information can be exchanged. They will not, except with low probability, be fooled into thinking they have succeeded in sharing secret information when the information is either not shared or not secret.

One attack, "selective pulse suppression", to which other quantum public key distribution schemes are susceptible, in principle is the splitting of some of communication node 12's coherent light pulses by an eavesdropper into two or more coherent subpulses, one of which the eavesdropper would measure, attempting to detect a photon in it, while forwarding the other subpulse (or a new pulse fabricated by the eavesdropper) to communication node 17 if the eavesdropper succeeds, and suppressing both pulses if the eavesdropper fails. This attack planned clandestinely biases the distribution of pulses reaching communication node 17 in favor of ones that the eavesdropper can successfully measure; to defend against the attack, communication node 12 must make its original pulses so dim $m \leq T$ where T is the transmission coefficient of the quantum channel 18, that the fraction $m^2/2$ that can be split at the upstream end of the quantum channel is smaller than the expected rate of arrival mT of photons at the downstream end. Together with the requirement that the rate of arrival of photons at the downstream end significantly exceed the dark count rate, this limits the earlier invention to channel whose transmission coefficients significantly exceeds $\sqrt{(d/Q)}$, where d and Q denote respectively, the dark count rate (per time slot) and the quantum efficiency of photodetector 84. By contrast, the present invention, in its unsymmetric beamsplitter version where both signal and reference pulses are measured by communication node 17, prevents the attack, as described below. This allows a constant intensity m (optimally about ⅓ expected photon) to be used at the upstream end regardless of T, with a consequence that the minimum transmission coefficient T that can be accommodated scales as d/Q rather than as $\sqrt{(d/Q)}$. In the present invention, a comparable attempt by an eavesdropper to use an unsymmetric measurement scheme such as communication node 17's yielding successes and failures, and then to bias the distribution of pulsed pairs reaching communication node 17 in favor of ones the eavesdropper was able to measure successfully, is frustrated by the presence of the bright reference light pulses which cannot be suppressed clandestinely because they are so bright that their presence at the expected time can be detected unambiguously by communication node 17. If the eavesdropper goes ahead anyway and suppresses a signal pulse (dim light pulse) without suppressing the corresponding reference pulse, no cancellation will occur in the receiving half-interferometer, and communication node 17's probability of registering a count will be reduced only to half its expected value in the absence of the eavesdropper's intervention. Such a count will, of course, be uncorrelated with communication node 12's original shift and so is as likely as not to lead to a detectable error, which ultimately will alert a communication nodes 12 and 17 to the fact that eavesdropping is taking place.

In the operation of the present invention, undetected inspection of key information in transit in quantum channel 18 is prevented by encoding each key bit in the phase of a very dim signal pulse of coherent light (less than 1 expected photon) relative to an accompanying reference light pulse. A train of such signal/reference pulsed pairs is sent through quantum channel 18 of low dispersion and low to moderate attenuation. Owing to the uncertainty principle by Heisenberg, and the fact that the dim signal pulses, because of their low intensity, represent non-orthogonal states, an eavesdropper cannot, in principle, gain complete information about the phase shifts by phase modulator 36 shown in FIG. 2.

After the quantum transmission has been sent and received, the sender and receiver exchange further messages over message channel 22 called the "public channel" which may be of any physical form, for example, radio as well as optical fiber or copper wire. These messages, which need not be kept secret from the eavesdropper, allow the legitimate sender and receiver to assess the extend of disturbance of the quantum transmission by eavesdropping and noise sources such as the photomultiplier dark current, and if the disturbance has not been too great, to distill from the sent and received versions of the quantum transmission, a smaller body of random key information which with high probability is known to the sender and receiver but to no one else.

To prevent an impersonation attack, the public channel messages must be authenticated (to detect a change) or otherwise protected against alteration or substitution, but they need not be kept secret. It should be emphasized that no effort need be made to guard the quantum channel 18 against passive or active wiretapping, because even if an eavesdropper did tap into it, the eavesdropper could not gain significant information about the key without introducing so much disturbance as to be detected.

When the invention is used with sufficiently low-noise and high-quantum efficiency photon detectors (noise power equivalent to less than 0.01 photons per resolving time), the invention can be used over optical channels of significantly greater attenuation, for example, greater than 20 db.

While there has been described and illustrated a secure communication network and an apparatus for distributing and receiving cryptographic key information, it will be apparent to those skilled in the art that modifications and variations are possible without deviating from the broad scope of the invention which shall be limited solely by the scope of the claims appended hereto.

Having thus described my invention, what I claim as new and desire to secure by Letters Patents is:

1. A secure communication network for sending messages unintelligible to an eavesdropper comprising:
    a plurality of communication nodes, each having a first, second and third port,
    a first quantum channel for conveying dim and reference light pulses connected to said first port of said plurality of communication nodes,
    a second timing channel for conveying timing signals connected to said second port of said plurality of communication nodes,
    a third message channel for conveying information selected from the group consisting of plain text and encrypted text connected to said third port of said plurality of communication nodes,
    at least one of said communication nodes including
    first means for sending a plurality of dim light pulses of coherent light of an intensity less than 1 expected photon per dim pulse spaced apart in time over said first quantum channel,
    second means for sending a plurality of reference light pulses of coherent light positioned in time with respect to said plurality of dim light pulses over said first quantum channel,
    a random number generator for generating random numbers,
    a phase modulator coupled to said first means and to said random number generator for setting the phase of said plurality of dim light pulses, said phase of each said dim light pulse chosen randomly from a plurality of predetermined values in response to said random numbers,
    third means for recording the phases of said plurality of dim light pulses sent over said first quantum channel,
    fourth means for sending timing signals over said second timing channel, and
    fifth means for sending and receiving information over said third message channel,
    at least another one of said communication nodes including sixth means connected to said first quantum channel for receiving and detecting at least some of said dim light pulses and their respective phase relative to the phase of respective ones of said plurality of reference pulses as a function of time,
    seventh means for recording the phases of said plurality of dim light pulses received over said quantum channel as a function of time, and
    eighth means for sending and receiving information over said third message channel.

2. An apparatus for distributing cryptographic key information from a first communication node to a second communication node comprising:
    a first quantum channel for conveying dim and reference light pulses connected to said first and second communication nodes,
    a second timing channel for conveying timing signals connected to said first and second communication nodes, said first communication node including
    first means for sending a plurality of dim light pulses of coherent light of an intensity less than 1 expected photon per dim light pulse spaced apart in time over said first quantum channel,
    second means for sending a plurality of reference light pulses positioned in time with respect to said plurality of dim light pulses over said first quantum channel,
    a random number generator for generating random numbers,
    a phase modulator coupled to said first means and to said random number generator for setting the phase of said plurality of dim light pulses, said phase of each said dim light pulse chosen randomly from a plurality of predetermined values in response to said random numbers,
    third means for recording the phase of said dim light pulses as a function of time, and
    fourth means for generating and sending a plurality of timing signals over said second timing channel,
    said second communication node including fifth means connected to said first quantum channel for detecting at least some of said dim light pulses and their respective phase relative to respective ones of said plurality of reference pulses as a function of time, and
    sixth means for recording the phases of said plurality of dim light pulses as a function of time.

3. An apparatus for generating cryptographic key information comprising:
    a light source for generating and sending a plurality of dim light pulses of coherent light of intensity of less than 1 expected photon per dim pulse spaced apart in time,
    a random number generator for generating random numbers,
    a phase modulator coupled to said light source and to said random number generator for setting the phase of each of said plurality of dim light pulses, said phase chosen randomly from a plurality of predetermined values in response to said random numbers, and first means for recording the respective phases of said plurality of dim light pulses as a function of time.

4. The apparatus of claim 3 wherein said light source includes means for generating and sending a plurality of reference light pulses positioned in time with respect to said plurality of dim light pulses.

5. The apparatus of claim 3 further including a quantum channel coupled to said phase modulator for distributing said plurality of dim light pulses.

6. An apparatus for receiving a plurality of dim light pulses comprising:

a first unsymmetric beamsplitter having a reflection/transmission ratio R coupled to a source of said plurality of dim light pulses, first means for conveying said reflected plurality of dim light pulses a predetermined distance and to the reflection side of a second unsymmetric beamsplitter having a reflection/transmission ration R, and a detector positioned in the path of said reflected plurality of dim pulses from said second unsymmetric beamsplitter, said first unsymmetric beamsplitter having a transmission path therethrough, through a phase modulator and through said second unsymmetric beamsplitter in alignment with said reflected plurality of dim light pulses to said detector whereby destructive or constructive phase interference occurs, a random number generator, said phase modulator coupled to said random number generator for setting the phase of said plurality of dim light pulses on said transmission path with said phase of each said dim light pulse chosen randomly from a plurality of predetermined values in response to said random numbers.

7. The apparatus of claim 1 wherein said another one of said n communication nodes includes:

a random number generator for generating random numbers, a phase modulator connected to said first port and to said random number generator for setting the phase of said reference light pulse by a plurality of predetermined values in response to said random numbers, fifth means for attenuating said bright pulse, sixth means for time shifting said dim pulse with respect to said bright pulse, seventh means for combining said attenuated and phase modulated bright pulse with said time shifted dim pulse whereby constructive interference occurs to provide at least an expected one photon output or whereby destructive interference occurs to provide substantially no expected photon output, eighth means for detecting said photon output at times constructive interference occurs, ninth means for receiving timing signals over said second timing channel, and tenth means for sending and receiving information over said third message channel.

8. A method for sending messages unintelligible to an eavesdropper in a communication network having:

a plurality of communication nodes, each having a first, second and third port, a first quantum channel for conveying dim and reference light pulses connected to said first port of said plurality of communication nodes, a second timing channel for conveying timing signals connected to said second port of said plurality of communication nodes, a third message channel for conveying information selected from the group consisting of plain text and encrypted text connected to said third port of said plurality of communication nodes, at least one of said communication nodes performing the steps of:

sending a plurality of dim light pulses of coherent light of an intensity less than 1 expected photon per dim pulse spaced apart in time over said first quantum channel, sending a plurality of reference light pulses of coherent light positioned in time with respect to said plurality of dim light pulses over said first quantum channel, setting the phase of said plurality of dim light pulses, said phase of each said dim light pulse chosen randomly from a plurality of predetermined values in response to said random numbers, recording the phases of said plurality of dim light pulses sent over said first quantum channel, sending timing signals over said second timing channel, and sending and receiving information over said third message channel, at least another one of said communication nodes performing the steps of receiving and detecting at least some of said dim light pulses and their respective phase relative to the phase of respective ones of said plurality of reference pulses as a function of time, recording the phases of said plurality of dim light pulses received over said quantum channel as a function of time, and sending and receiving information over said third message channel.

9. A method for distributing cryptographic key information from a first communication node to a second communication node connected together by a first quantum channel for conveying dim and reference light pulses connected to said first and second communication nodes, a second timing channel for conveying timing signals connected to said first and second communication nodes, said first communication node performing the steps of sending a plurality of dim light pulses of coherent light of an intensity less than 1 expected photon per dim light pulse spaced apart in time over said first quantum channel, sending a plurality of reference light pulses positioned in time with respect to said plurality of dim light pulses over said first quantum channel, setting the phase of said plurality of dim light pulses, said phase of each said dim light pulse chosen randomly from a plurality of predetermined values in response to said random numbers, recording the phase of said dim light pulses as a function of time, and generating and sending a plurality of timing signals over said second timing channel, said second communication node performing the steps of detecting at least some of said dim light pulses and their respective phase relative to respective ones of said plurality of reference pulses as a function of time, and recording the phases of said plurality of dim light pulses as a function of time.

10. A method for generating cryptographic key information comprising the steps of:

generating and sending a plurality of dim light pulses of coherent light of intensity of less than 1 expected photon per dim pulse spaced apart in time, setting the phase of each of said plurality of dim light pulses, said phase chosen randomly from a plurality of predetermined values in response to said random numbers, and recording the respective phases of said plurality of dim light pulses as a function of time.

* * * * *

UNITED STATES PATENT AND TRADEMARK OFFICE
CERTIFICATE OF CORRECTION

PATENT NO. : 5,307,410
DATED : April 26, 1994
INVENTOR(S) : Charles H. Bennett

It is certified that error appears in the above-identified patent and that said Letters Patent is hereby corrected as shown below:

Column 3, line 35, after "of" insert --coherent--.

Column 6, line 68, change "EG & G." to --EG & G, Inc., Wellesley, Massachusetts.--.

In The Claims:

Column 14, after line 17, insert --generating random numbers,--;

Column 14, after line 55, insert --generating random numbers,--.

Column 15, after line 7, insert --generating random numbers,--.

Signed and Sealed this

Eighteenth Day of October, 1994

Attest:

BRUCE LEHMAN

Attesting Officer

Commissioner of Patents and Trademarks